H. G. WEIBLING.

Axle.

No. 1,768. Reissued Sept 13, 1864.

Witnesses:
Julius R. Pinero
F. H. Boughton

Inventor:
Hamon G. Weibling

N. PETERS, PHOTO-LITHOGRAPHER, WASHINGTON, D. C.

UNITED STATES PATENT OFFICE.

HARMON G. WEIBLING, OF DENVER, COLORADO.

IMPROVEMENT IN CARRIAGE-WHEELS.

Specification forming part of Letters Patent No. 37,480, dated January 20, 1863; Reissue No. 1,768, dated September 13, 1864.

*To all whom it may concern:*

Be it known that I, HARMON G. WEIBLING, of Denver city, in the Territory of Colorado, have invented a new and Improved Axle, by means of which the friction of the wheel turning thereon is greatly lessened; and I do hereby declare that the following is a full and exact description thereof, reference being had to the accompanying drawings, and to the letters of reference marked thereon.

The nature of my invention consists in applying friction-rollers longitudinally to the under side of the spindle forming the outside of the axle upon which the wheel rests, the rollers being embedded to a little more than half their diameter in a groove or grooves cut in the under side of such spindle. Thus the axle, preserving its relative position, will rest within the hub of the wheel upon these longitudinal rollers, and as the wheel turns the rollers embedded partially within the axle will turn also, thereby greatly lessening the friction, care being also taken to keep them properly lubricated.

My invention also consists in applying friction-rollers to the shoulder of the axle against which the hub of the wheel rests when pressed onto the axle, and also to the inside surface of the nut which keeps the wheel from coming off when it has been placed upon the axle. These rollers are also partially embedded in the shoulder and in the nut in grooves, permitting the rollers to turn when pressed against by the wheel, but holding them in their relative places. By these means I oppose to the turning wheel within its hub, and at each end thereof, friction-rollers, turning themselves whenever the wheel is in motion, and thereby decreasing the amount of friction which would otherwise exist.

Figure 1:
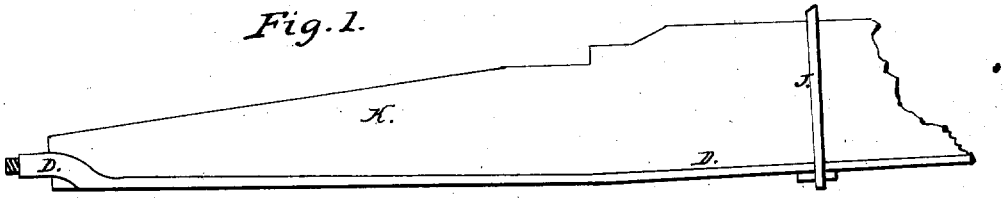

In the drawings, Figure 1 represents a longitudinal section of the axle before the skein or spindle is placed upon it, along the under side of which is an iron strap, (shown at D,) bent at the end of the axle and projecting slightly from it, having a thread cut upon its end to receive a nut.

Figure 3:
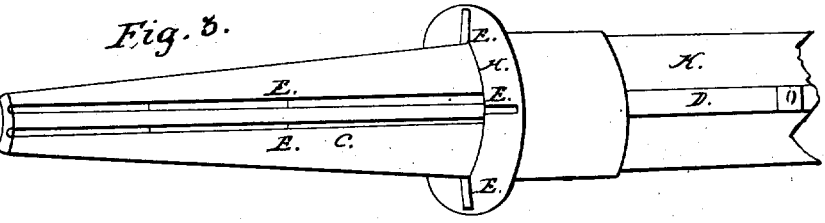

Fig. 3 represents the spindle C as placed upon the axle K, showing at E E the friction-rollers running longitudinally along the under side of the spindle as attached to the axle. The shoulder against which the hub or the flange of the box receiving the axle rests when the wheel is on appears at H, and the short rollers embedded in this shoulder are seen at E E E. The strap D may be seen in this figure projecting from the spindle at N, when the nut M is to be applied.

Figure 2:
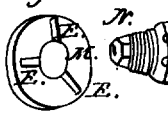

In Fig. 2 the rollers to be opposed to the outside flange of the box within which the spindle rests when the wheel is on the axle are shown at E E E on the inner surface of the nut M.

Figure 4:
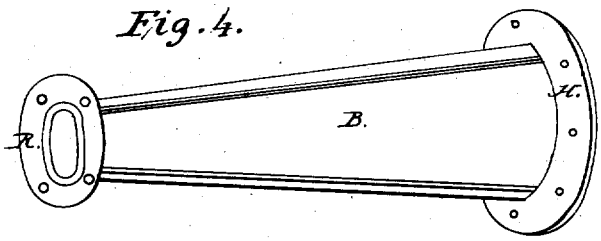
Figure 4:
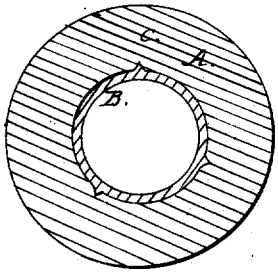
Figure 4:
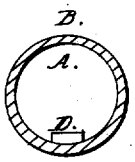

Fig. 4 represents the box which forms the inside surface of the hub of the wheel, and in which the spindle C, as shown in Fig. 3, rests when the wheel is on its axle. The flanges of this box are shown at R and H, against which come the rollers in the shoulder and nut, heretofore named.

The friction-rollers above named should be made of steel or chilled iron, and the grooves in which they are contained, and in which they roll, should be concave, approaching a cylinder in form, so as to hold the rollers in place and yet leave them projecting along their entire length from the surface of the spindle in which the grooves are cut. The grooves in the material of which the spindle is made may be lined with Babbitt metal or other material. I have generally used two of these longitudinal grooves in the under side of each spindle; but more may be used, if deemed best. The rollers should be made in short pieces whenever the spindle is cone-like in shape, as shown in the figures. I generally use three to fill one groove in length for a wagon-wheel of ordinary size. Each roller should act independently of any other in its own position in the groove in which it is placed. The rollers in the shoulder H and in the nut M should be placed in a position perpendicular to the axis of the axle, the grooves being cut to correspond thereto, so that the rollers may impinge regularly against the hub of the wheel. They may be made of two or more pieces to turn separately.

The spindle C may be fastened to the axle K with gutta-percha packing, the gutta-percha to be dissolved to the consistency of thick tar and then spread on the surface of the axle K and the inner surface of the spindle C, which is then forced upon the axle to its proper place and secured by means of the iron strap or bar D, inserted in a groove in the lower side of the axle, and extending from one end to the other of the axle or to the bolt J, as shown in Fig. 1. Any kind of cement may be used instead of gutta-percha packing.

I am aware that friction-rollers have been hitherto used in the boxes of wheels and attached to them, on which the axle has rested, and I do not claim to have invented the use of friction-rollers; but

What I claim as my invention, and desire to secure by Letters Patent, is—

1. The application of friction-rollers partially embedded in a groove in the under side of the axle or spindle upon which the wheel is placed, substantially as and for the purposes above described.

2. The application of friction-rollers E E E, embedded partially in the surface of the shoulder H and the nut M, as and for the purposes above described.

HARMON G. WEIBLING.

Witnesses:

JULIUS R. POMEROY,
W. H. BOUGHTON.